United States Patent
Conway

(10) Patent No.: US 6,286,850 B1
(45) Date of Patent: Sep. 11, 2001

(54) BALANCE BAR

(76) Inventor: Richard P. Conway, 27 Greenbriar Dr., Lancaster, NY (US) 14086

( * ) Notice: Subject to any disclaimer, the term of this patent is extended or adjusted under 35 U.S.C. 154(b) by 0 days.

(21) Appl. No.: 09/427,551

(22) Filed: Oct. 27, 1999

Related U.S. Application Data

(60) Provisional application No. 60/127,613, filed on Apr. 1, 1999.

(51) Int. Cl.⁷ ...................................................... B62H 7/00
(52) U.S. Cl. .............................................................. 280/302
(58) Field of Search ................................ 280/293, 288.4, 280/295, 296, 298, 299, 301, 302, 304.5, 47.17, 47.131

(56) References Cited

U.S. PATENT DOCUMENTS

| | | | |
|---|---|---|---|
| 1,449,255 | * | 3/1923 | Abrahams et al. .................... 280/7.1 |
| 4,917,398 | * | 4/1990 | De Mirando Pinto ................ 280/293 |
| 5,395,130 | * | 3/1995 | Rubin .................................... 280/293 |
| 5,407,222 | * | 4/1995 | Harrison ............................... 280/293 |
| 5,441,297 | * | 8/1995 | Krohn et al. .......................... 280/655 |
| 5,791,675 | * | 8/1998 | Fleischer ............................... 280/293 |

FOREIGN PATENT DOCUMENTS

2600963 * 7/1986 (FR) ..................................... 280/293

* cited by examiner

Primary Examiner—Robert P. Olszewski
Assistant Examiner—Michael Cuff
(74) Attorney, Agent, or Firm—Rodger H. Flagg

(57) ABSTRACT

A U-shaped balance bar is provided which is pivotably secured to the rear axle of a bicycle, and includes a stop portion to prevent the bar or handle from falling to the ground during use. The purpose of the balance bar is to permit a rider, such as a child, to learn to use a bicycle while a second person, such as a parent or coach, can use the bar or handle to stabilize the bicycle when necessary. Since the bar or handle is pivotable, it easily adjusts to persons of different height and reach, so that they can hold the balance bar comfortably during use. The balance bar has an L-shaped portion stop portion, to prevent the bar or handle from falling onto the ground. This balance bar is of unitary construction, to reduce manufacturing and assembly costs.

17 Claims, 2 Drawing Sheets

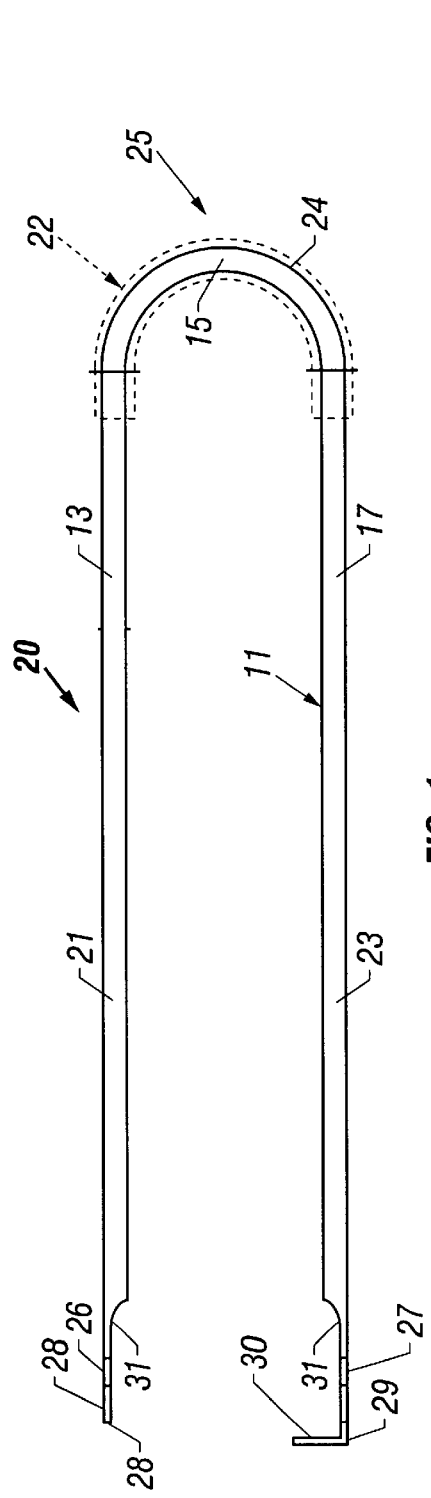
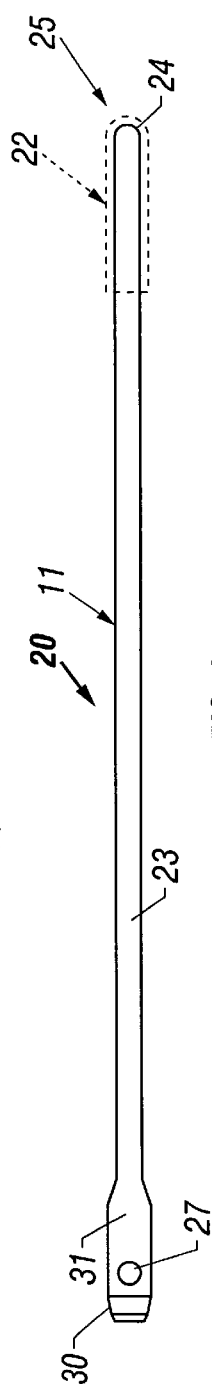
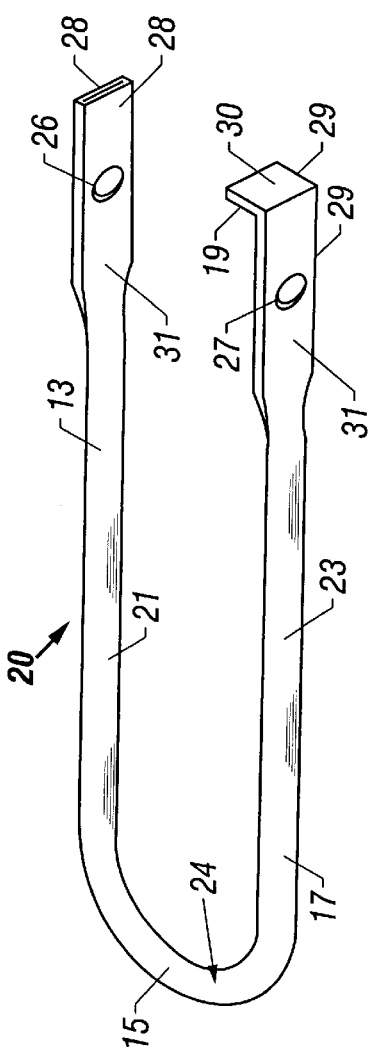
FIG. 1
FIG. 2
FIG. 3

BALANCE BAR

This application claims the benefit of U.S. Provisional Application No. 60/127,613, filed Apr. 1, 1999.

FIELD OF THE INVENTION

The present invention relates to devices for assisting in training a person in the use of a two-wheel bicycle. More particularly, the invention relates to a pivotable member connected to a bicycle which enables a second person, for example a parent, to assist in maintaining balance of the bicycle while the rider, for example a child, learns to ride the bicycle.

BACKGROUND OF THE INVENTION

The use of training wheels on bicycles is well known. However, such training wheels still cannot prevent a child from tipping over a bicycle while attempting to ride it. Further, use of training wheels requires manual assembly, and subsequent removal of the training wheels is eventually required. Also, with training wheels on a bicycle, it is inconvenient to remove the training wheels when a second child, who is already an experienced bicycle rider, wishes to use the bicycle. Other types of training aids used in teaching use of a bicycle are known, and are described hereunder.

U.S. Pat. No. 5,577,750 to Sklar discloses a bicycle stabilizing flexpole trainer. The trainer includes a removable member which is tubular and elongated, and has a padded gripping portion at an end distal from the bicycle. It is attached fixedly, so that it cannot pivot or move, to a rear frame member of the bicycle.

In U.S. Pat. No. 5,791,675 to Fleisher, a bicycle training device is shown for attachment to the frame of a bicycle. The bicycle training device is connected to the rear axle of a bicycle, and is formed as a U-shaped tubular member. The tubular member is bent at an angle, and is fixed to the frame against pivot motion.

In U.S. Pat. No. 5,395,130 to Rubin, a bicycle balance trainer is shown. The bicycle balance trainer includes a bent U-shaped member which is attached near the rear axle of a bicycle. The bent portion is resiliently connected to the straight portions of the U-shaped member, and is extensible so that the straight portions are of variable length according to the preferences of the user. The bent U-shaped member is fixedly connected so that it does not rotate or pivot with respect to the frame of the bicycle.

U.S. Pat. No. 4,917,398 to de Miranda Pinto is directed to a bicycle training handle. The training handle is formed as a forked bar connected to the rear axle of a bicycle, and is pivotally mounted. It includes a bent U-shaped portion which is cushioned. A mechanical linkage is connected to the seat portion of the bicycle and to the forked bar, as shown in FIG. 3 of this patent, to limit a range of pivoting motion of the forked bar.

In U.S. Pat. No. 5,407,222 to Harrison, a bicycle guiding device is shown. The bicycle guiding device is a generally U-shaped member which is fixedly connected to a seat portion and to a rear axle of a bicycle, extending nearly vertically upwards.

U.S. Pat. No. 4,903,975 to Weisbrodt et al. is directed to a rear bicycle attachment handle. The handle includes a pair of straight members having a connecting member serving as a handle at one end, two ends connectable to the rear axle of a bicycle, a cross member connecting the pair of straight members at a location below the handle portion, and a bracing strut connected to the cross member for attaching the assembly to another portion of the bicycle to secure the assembly so that it is fixedly connected against pivoting motion.

In U.S. Pat. No. 5,683,093 to Hayes, a device is shown which is attachable to a bicycle to allow stabilizing of a learning rider. The device includes a handle having a forked end portion which is fixedly connected to the rear axle of a bicycle, and a bracing member secured to a seat portion of the bicycle to prevent pivotal motion of the device.

U.S. Pat. No. 5,303,944 to Kalmus discloses a bicycle riding training device. The device includes a handle which is releasably attached to a securing portion, and can be made adjustable in length. The securing portion is fixed to extend from the rear of a bicycle seat.

In U.S. Pat. No. 2,672,351 to Kane, a handle is shown for pushing tricycles. The handle includes a straight tubular member secured to a frame portion located behind the seat, and includes a support member connected to secure the straight tubular member fixedly, preventing pivoting motion.

U.S. Pat. No. 5,154,096 to Geller et al. discloses a guidance apparatus for bicycle training. The apparatus includes a handle portion secured to the bicycle frame behind the seat, and includes a hand brake arrangement secured to the end of the handle to permit the adult to exert a braking force by squeezing the hand brake at the handle portion. The handle portion is secured against pivotal motion.

SUMMARY OF THE INVENTION

According to the present invention, a device is provided which meets the aforementioned requirements and needs in the prior art. Specifically, the device according to the present invention provides a unitary U-shaped balance bar which is pivotably secured to a bicycle, and includes a stop portion to prevent the bar or handle from falling to the ground during use. The purpose of the balance bar is to permit a rider, such as a child, to learn to use a bicycle while a second person, such as a parent or coach, can use the balance bar to stabilize the bicycle when necessary. Since the balance bar is pivotable about the rear axle of a bicycle, it adjusts simply to persons of different height so that they can hold it comfortably. The balance bar has a stop portion, which can be an L-shaped portion, to prevent the balance bar from falling onto the ground. This invention provides adjustable height and angle of support along with safety stopping features in a single unitary unit.

The balance bar according to the present invention is used to aid and assist the parent or guardian of a child who is just starting to learn how to ride a bicycle without the aid of training wheels. The balance bar according to the present invention provides the parent or guardian with greater stability, control, and upright posture while not crowding the child near the seat or handlebars of the bicycle, as is typical where the parent holds the frame, seat, or handlebars of the bicycle to attempt to provide stability. In this manner, the balance bar provides the child or rider with great viewing capability and comfort along with greater confidence during the learning process. In addition, the parent or guardian is able to assist the child for a much longer period of time in a comfortable upright walking or jogging position. This is a significant improvement to the usual crouch/squatting position that is typical when the parent or guardian is holding onto the frame, seat, or handlebars of the bicycle.

The balance bar according to the present invention is formed preferably as a steel or metal member which is U-shaped, having a curved end serving as a handle portion and having two distal ends which are connected to the rear axle of the bicycle. The handle portion preferably includes a resilient cover, such as a foam or rubber cushion, to facilitate manual gripping. The two distal ends of the balance bar are preferably flattened, having axially aligned apertures therein to receive the rear axle of a bicycle, and thereby permit ready attachment to the rear axle of the bicycle. The U-shaped steel member is preferably formed from hollow tubing having an outer diameter, which has preferably been selected from a range of from one-half inch to one inch in diameter.

Nylon locking nuts and flat or resilient washers are preferably used to secure the U-shaped steel member according to the present invention. The stop portion can be formed as an L-shaped portion on one or both distal ends of the U-shaped steel member according to the present invention. This stop portion permits raising and lowering of the bar or handle according to the present invention within a predetermined range, and prevents the bar or handle from falling onto the ground.

Other objects and advantages of the present invention will be more readily apparent from the following detailed description when read in conjunction with the accompanying drawings.

BRIEF DESCRIPTION OF THE DRAWINGS

FIG. 1 is a top elevational view of a balance bar according to the present invention.

FIG. 2 is a side elevational view of the balance bar of FIG. 1.

FIG. 3 is a perspective view of the device of FIGS. 1 and 2.

DETAILED DESCRIPTION OF THE INVENTION

Figure 4:
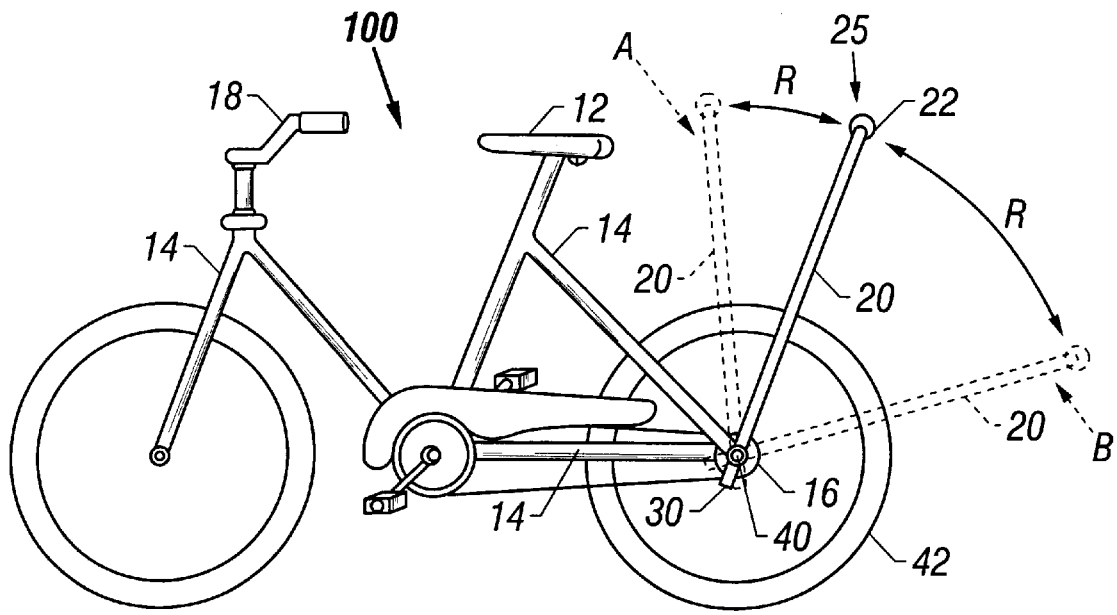
FIG. 4 is a schematic, side elevational view of the balance bar of FIGS. 1 and 2 mounted on a bicycle.

A U-shaped balance bar 20 is shown in FIG. 1 in top elevational view. The balance bar 20 is preferably formed of a unitary rod 1 having a first rod portion 13 forming a first arm 21, a second rod portion 15 forming a bend 24, a third rod portion 17 forming a second arm 23, and a fourth rod portion 19 forming a first stop member 30. The first and third rod portions 13, 17 are sized to extend from the rear axle 40 to a location extending beyond the radius of the rear tire 42.

As shown in FIG. 1, the first rod portion 13, second rod portion 15, third rod portion 17 and fourth rod portion 19 are formed from a unitary rod 11 connecting the first arm 21 with the bend 24, the bend with the second arm 23, and at least one of the first arm 21 and second arm 23 with at least one stop member 30.

Preferably, a resilient material 22 covers the bend 24, which serves as a handle 25 when the U-shaped balance bar apparatus 20 is installed on the rear axle 40 of a bicycle 100.

The first arm 21 has a first distal end 28, and the second arm 23 has a second distal end 29. Preferably, the first and second distal ends 28, 29 are flattened into a compact configuration in proximity to the first and second apertures 26, 27. The first and second apertures 26, 27 are positioned in axial alignment with each other, and sized to receive the first and second ends 92, 94 of the rear axle 40 through the first and second apertures 26, 27. This is accomplished by flexing the first and second arms 21, 23 at installation, and securing the first and second arms 21, 23 to the respective first and second ends 92, 94 of the rear axle 40.

As shown in FIG. 1, the second distal end 29 terminates in a stop member 30, which extends approximately at a right angles to the second arm 23, facing towards the first arm 21. Alternately, the stop member 30 may be positioned at the first distal end 28 of the first arm 21, with the first stop member 30 facing the second arm 23. First and second stop members 30, 32 may also be used to provide redundant stop members 30, 32 for added safety. The first and/or second stop member 30/32 engages the bicycle frame 14 at a location forward of the rear axle 40. This keeps the U-shaped balance bar 20 positioned above horizontal to avoid snagging objects along the around as the rider advances on the bicycle 100. The U-shaped balance bar apparatus 20 may be adjustably positioned between a substantially vertical position and a plurality of above horizontal positions to suit the size and reach of the person assisting the balance of the rider (not shown).

The first arm 21 has a first aperture 26, and the second arm 23 has a second aperture 27 located in axial alignment near the distal ends 28, 29 of the first and second arms 21, 23. The first aperture 26 and second aperture 27 are axially aligned for receiving the opposing ends 92, 94 of a rear axle 40 of a bicycle 100, so that the balance bar 20 can be mounted to the rear axle 40 of the bicycle 100.

The first arm 21 and second arm 23 are each preferably approximately thirty-two and one-half inches long, and the bend 24 is preferably curved about a radius of approximately 3 and one-half inches, so that the total length of the formed balance bar 20 is approximately 36 inches. The first and second arms 21 and 23 are preferably separated by a distance of approximately 7 inches.

While these sizes are representative of one preferred embodiment, it is to be understood that the first arm 21 and second arm 23 are sized to extend from proximity of the rear axle 40 and are sized to extend beyond the radius of the rear tire 42, with the bend portion 24 forming a handle 25 there-between. Thus, the U-shaped balance bar apparatus 20 disclosed herein is adaptable for use on either new or existing bicycles of varying sizes.

FIG. 2 is a side elevational view of the balance bar of FIG. 1. The stop member 30 is seen in end view in this drawing, as is the second arm 23 and the second aperture 27. The resilient material 22 on the handle portion 25 is schematically shown in dashed outline in FIGS. 1 and 2, and can extend for a greater or lesser length than that shown in the drawings. Preferably, the resilient material 22 is made of foam or rubber material. Further, the resilient material 22 can be made to extend substantially over most of the length of the balance bar 20 if so desired. All such variations are contemplated as being within the scope of the present invention.

Figure 5:
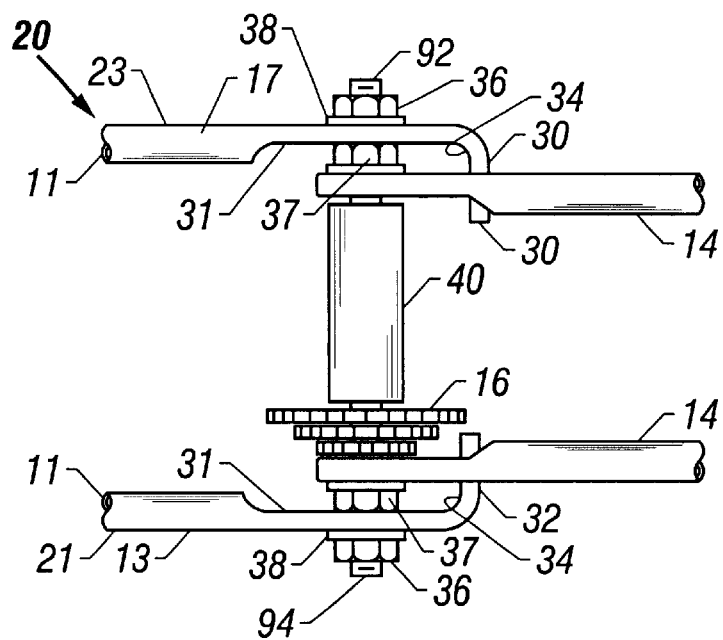
FIG. 5 is a cross sectional view of the rear axle shown in FIG. 4.

FIG. 3 is a perspective view of the device of FIGS. 1 and 2. Here, the first and second ends 28 and 29 are flattened, as shown, in proximity to the first and second axially aligned apertures 26 and 27. The axially aligned apertures 26, 27 extend through the flattened portions of the first and second distal ends 28, 29. The stop member 30 on second arm 23 is clearly shown extending at right angles towards the first arm 21 in this view in FIG. 3 and FIG. 5. Note that a radius 34 may be provided between the flattened portion 31 of the first and/or second stop member 30, 32, as shown in FIG. 5.

FIG. 4 is a schematic, side elevational view of the balance bar 20 of FIGS. 1 and 2 mounted on a bicycle 100. The bicycle 100 has a frame 14, a seat 12, and a rear tire 42 as shown in FIG. 4. As can be seen in this view, the balance bar 20 is pivotably supported on a rear axle 40 of the bicycle 100, so that it can pivot between an uppermost substantially vertical position A and a lowermost above horizontal position B. The rear sprocket 16 of the bicycle 100 may be mounted to the rear axle 40 either inside the frame 14, as shown in FIG. 5, or outside the frame 14 as shown in FIG. 4, as both inner and outer configurations are known and practiced in the art.

The stop member 30 is positioned to engage a portion of the frame 14 at position B, so that it limits the lowermost position of the balance bar 20 to an above horizontal position. This prevents the balance bar 20 from falling onto the ground. If the balance bar 20 were to fall onto the ground while a child is riding, there is a possibility that the balance bar 20 might catch on something on the ground, causing the rider fall. The positions A and B in FIG. 4 are schematically shown, and will vary by the location and size of the frame 14 of the specific model of bicycle 100 and the position of the stop 30 in relation to the second aperture 27 on the balance bar 20.

In a variation, the stop member 30 can be positioned so that it reduces or enlarges the permitted range of travel, limiting the distance between the positions A and B. These and other variations are considered to be within the scope of the present invention.

The balance bar or handle 20 according to the present invention is used to aid and assist the parent or guardian of a child or ridger who is just starting to learn how to ride a bicycle 100 without the aid of training wheels (not shown). The U-shaped balance bar 20 according to the present invention provides the parent or guardian with greater stability, control, and upright posture while not crowding the child near the seat 12 or handlebars 18 of the bicycle 100. In this manner, the balance bar 20 of the present invention provides the child or other user with greater viewing capability and comfort along with greater confidence during the process of learning to ride a bicycle 100.

In addition, the parent or guardian is able to assist the rider for a much longer period of time in a comfortable upright walking or jogging position. This provides a significant improvement to the usual crouch/squatting position that is typical when the parent or guardian is holding onto the frame 14, seat 12, or handlebars 18 of the bicycle 100. The adjustably positioned balance bar 20 is easily positioned to suit either tall or short users, without the need for tools to position the balance bar 20 at a preferred position when pushing or balancing a bicycle 100 to aid a beginning user in learning to ride a bicycle 100.

The balance bar 20 according to the present invention is preferably formed as a unitary tubular member, having a round, square, rectangular, or multisided cross-sectional profile. The balance bar 20 is preferably made of a metal material selected from steel, stainless steel and aluminum. The balance bar 20 is of a generally U-shaped configuration, as shown in FIGS. 1–3. A curved portion 24 extends beyond the rear tire 40 of the bicycle 100, and extends between the first arm 21 and the second arm 23, serving as a handle portion 25. The handle portion 25 of the balance bar 20 preferably is covered with a resilient material 22, for example a cushioned foam material, or rubber material or plastic material, to facilitate manual gripping.

The first and second distal ends 28 and 29 of the balance bar 20 are preferably flattened 31 to provide a more compact assembly on the rear axle 40 of the new or existing bicycle 100. First and second axially aligned apertures 26 and 27 extend through the flattened portion 31 of the first and second arms 21, 23. The axially aligned apertures 26, 27 are sized to be closely received about the opposing distal ends 92, 94 of the rear axle 40 of the bicycle 100. The U-shaped balance bar 20 is preferably formed from hollow steel tubing having an outer diameter which is is selected to be approximately between one-half an inch to one inch in diameter, with three-fourths of an inch in diameter being preferred.

As shown in FIG. 5, threaded nuts 36, such as nylon locking nuts, are preferably provided to secure the U-shaped balance bar 20 to the opposing distal ends 92, 94 of the hub 40 according to the present invention. This would preferably also include the use of washers 38, such as flat washers, or resilient washers 38 which are preferably positioned between the balance bar 20 and the locking nuts 36, to reduce the frictional force applied to the nylon locking nuts 36, and to allow the balance bar 20 to be adjustably positioned during use without the need for tools.

The use of washers 38 eliminates any loosening effect on the U-shaped balance bar 20 as it is moved between substantially vertical position and a plurality of above-horizontal positions during use. The locking nuts 36 are tightened sufficiently to maintain the adjustable height and angle of the balance bar 20 between positions A and B shown in FIG. 4, while maintaining a frictional force to maintain the position of the balance bar 20 wherever the user moves it, without being unduly difficult to move. Washers 38 useful for this purpose may include nylon washers, plastic washers, rubber washers, brass washers, metal flat washers, or the like.

The locking nuts 36 and washers 38 are aligned and threaded onto the external threaded ends 92, 94 of the rear axle 40. The opposing threaded ends 92, 94 are often called a skewer which is preferably sized to receive the frame 14 as well as the balance bar 20, and the locking nuts 36 and washers 38, as best shown in FIG. 5. Other configurations of the locking nuts 36 and washers 38 may be adapted for use on various existing rear axle configurations, including cam-release levers (not shown), acorn nuts (not shown), etc. and such adaptations are intended to fall within the scope of this disclosure.

The stop portion 30 can be formed as an L-shaped portion on one (or even both) of the first and second distal ends 29 and 30 of the U-shaped steel member 20 according to the present invention, as shown in FIG. 1. This stop portion 30 permits manual raising, lowering and positioning of the bar or handle 20 within a predetermined range (A to B) shown in FIG. 4, and prevents the balance bar 20 from falling onto the ground during use.

The invention being thus described, it will be evident that the same may be varied in many ways. Such variations are not to be regarded as a departure from the spirit and scope of the invention and all such modifications are intended to be included within the scope of the claims.

I claim:

1. A U-shaped balance bar apparatus for connection to a rear axle of a bicycle, which comprises:

a unitary rod having a first rod portion forming a first arm having a flattened first distal end with a first aperture extending through the flattened portion of first arm near the first distal end, a second rod portion forming a handle extending between the first arm and a second arm, a third rod portion forming a second arm which extends substantially in spaced relation parallel to the first arm, the second arm having a second flattened distal end with a second aperture extending through the second flattened end in axial alignment with the first aperture, and a fourth rod portion extending from the first flattened portion of the first arm at a location below the second aperture towards the second arm to form a stop member for limiting travel of the unitary balance bar between a first upright position and a second above horizontal position, when the first aperture and the second aperture are positioned for attachment to the rear axle of the bicycle.

2. The balance bar apparatus of claim 1, wherein the unitary rod is selected from one of: a flat rod, a cylindrical rod, a tubular rod, a square rod, a rectangular rod and a multi-sided rod.

3. The balance bar apparatus of claim 1, wherein the unitary rod is made of a metal selected from one of: steel, stainless steel, and aluminum.

4. The balance bar apparatus of claim 1, wherein the second rod portion forming a handle is covered with a resilient handle covering to improve comfort and gripping of said handle during use.

5. The balance bar apparatus of claim 1, wherein a first stop member extends from a first distal end of the first rod portion at a location below the first aperture and a second stop member extends from the second distal end of the second rod portion below the second aperture, the stop members to maintain the balance bar apparatus in an above horizontal position for improved safety during use.

6. The balance bar apparatus of claim 1, wherein the unitary balance bar apparatus is adapted to be moved between an upright position for ease of storage, and lowered to a selected above-horizontal position to suit the height and reach of a person assisting a rider to maintain the rider's balance during use.

7. The balance bar apparatus of claim 1, wherein a first resilient washer is provided adjacent to the first aperture in the first distal end of the first rod portion, and a second resilient washer is provided adjacent to the second aperture in the second rod portion, and the first and second resilient washers are partially compressed to provide a adjustable and movable means of securement of the balance bar apparatus when attached to the rear axle of the bicycle, to enable the user to adjustably position and maintain the balance bar apparatus between an upright position and an above horizontal position during use without the aid of tools.

8. A unitary U-shaped balance bar apparatus for attachment to a rear axle of an existing bicycle having a bicycle frame, which comprises:

a unitary tubular rod having a first tubular rod portion forming a first arm, the first arm having a flattened first distal end with a first aperture extending through the flattened first distal end, a second tubular rod portion extending from the first tubular rod portion, the second tubular rod portion forming a handle portion extending from the first arm to a second arm; the second arm extending from the second tubular rod portion substantially parallel to the first arm; the second arm having a second flattened distal end with a second aperture extending in axial alignment with the first aperture through the second flattened distal end; a fourth rod portion extending from the second distal end of the second arm beneath the second aperture to form a first stop member extending towards the first arm, said first stop member having the capability to engage a portion of the bicycle frame at a location forward of the rear axle, the stop member for limiting travel of the balance bar between an upright position and an above horizontal position; and a fifth rod portion extending from the first distal end of the first arm towards the second arm to provide a redundant second stop member located beneath the first aperture, for added safety during use.

9. The balance bar apparatus of claim 8, wherein the unitary tubular rod is selected from a cross sectional configuration comprising a flat tubular rod, a round tubular rod, a square tubular rod, a rectangular tubular rod and a multi-sided tubular rod.

10. The balance bar apparatus of claim 8, wherein the unitary tubular rod is made of a metal selected from at least one of: steel, stainless steel, and aluminum.

11. The balance bar apparatus of claim 8, wherein the second rod portion forming a handle is covered with a resilient covering material to improve comfort and ease of gripping during use.

12. The balance bar apparatus of claim 8, wherein the unitary balance bar apparatus may be selectively moved to an upright position for ease of storage, and selectively lowered from the upright position to a plurality of above-horizontal positions to suit the height and reach of a person assisting a rider to maintain a rider's balance on the bicycle during use, and wherein the stop member located below the axle aperture engages s portion of the bicycle frame to prevent the unitary balance bar apparatus from dragging on the ground when released by said person.

13. The balance bar apparatus of claim 8, wherein a first resilient washer is provided between the first rear axle nut and the first aperture in the first distal end of the first rod portion, and a second resilient washer is provided between the second rear axle nut and the second aperture in the second distal end of the second rod portion, the first and second resilient washers are partially compressed when installed upon the bicycle axle to provide adjustable positioning and securement of the balance bar apparatus in relation to the rear axle of the bicycle, to enable the user to adjustably position the balance bar apparatus between an upright position and a plurality of above horizontal positions during use, and wherein the balance bar apparatus will maintain the position of the balance bar when the balance bar apparatus is not being held by the person assisting the rider to maintain balance while riding the bicycle.

14. A U-shaped balance bar apparatus for connection to a rear axle of an existing bicycle having a bicycle frame, a front tire and a rear tire, a front axle and a rear axle, which comprises:

a unitary tubular metal rod having a first rod portion forming a first arm which extends from a first side of the rear axle of the bicycle to a location beyond the radius of the rear tire of said bicycle, the first arm having a flattened first distal end portion with a first axle aperture extending through the flattened first distal end portion, the first axle aperture sized to closely receive a first side of the rear axle there-through; a second rod portion extending between the first arm and a second arm to form a handle portion there-between; the handle portion having a resilient handle covering; a third rod portion forming a second arm which extends from the handle portion to a second distal end substantially parallel in spaced relation to the first arm, the second arm having a flattened second distal end portion with a second axle aperture extending in axial alignment with the first axle aperture through the second distal end portion, the second aperture sized to closely receive the second end of the rear axle there-through; and a fourth rod portion extending from the first distal end of the first arm towards the second arm, the fourth rod portion positioned to form a stop member at a location below the first aperture to engage a portion of the bicycle frame at a location forward of the rear axle, the stop member positioned for limiting travel of the balance bar between an upright position and a plurality of above horizontal positions, and wherein threaded nuts are engagable with respective first and second threaded ends of the rear axle of the bicycle to releasably secure and adjustably position the balance bar between upright and above horizontal positions.

15. The balance bar apparatus of claim 14, wherein a first stop member extends from a first distal end of the first rod portion and a second stop member extends from the second distal end of the second rod portion towards the first stop member to engage opposing sides of the bicycle frame in proximity to the rear axle of the bicycle for redundant safety during use.

16. The balance bar apparatus of claim 14, wherein the unitary balance bar apparatus may be manually rotated about the rear axle to an upright position for ease of storage, and manually lowered to a variety of selected above-horizontal positions to suit the height and reach of a person assisting a rider to maintain the rider's balance during use.

17. The balance bar apparatus of claim 14, wherein a first resilient washer is partially compressed between a first rear axle nut and the first aperture in the first distal end of the first rod portion, and a second resilient washer is partially compressed between a second rear axle nut and the second aperture in the second distal end of the second rod portion, the first and second resilient washers serving to provide a rotatable means of securement of the balance bar apparatus in relation to the rear axle of the bicycle, to enable the user to selectively, adjustably position the balance bar apparatus between an upright position and a plurality of above horizontal positions during use, and wherein the balance bar apparatus will maintain the position of the balance bar when the balance bar apparatus is not selectively biased by the user.

* * * * *